United States Patent
Ho et al.

(10) Patent No.: US 6,697,777 B1
(45) Date of Patent: Feb. 24, 2004

(54) SPEECH RECOGNITION USER INTERFACE

(75) Inventors: Sebastian Sai Dun Ho, Renton, WA (US); Jeffrey C. Reynar, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 764 days.

(21) Appl. No.: 09/605,769

(22) Filed: Jun. 28, 2000

(51) Int. Cl.$^7$ .............................................. G10L 15/26
(52) U.S. Cl. ...................................... 704/235; 704/270
(58) Field of Search ................................. 704/235, 270, 704/275, 201, 251, 260, 278

(56) References Cited

U.S. PATENT DOCUMENTS

| | | | |
|---|---|---|---|
| 4,914,704 A | * | 4/1990 | Cole et al. .................. 704/235 |
| 5,864,805 A | * | 1/1999 | Chen et al. .................. 704/235 |
| 6,415,258 B1 | * | 7/2002 | Reynar et al. ............... 704/235 |

* cited by examiner

*Primary Examiner*—David D. Knepper
(74) *Attorney, Agent, or Firm*—Merchant & Gould

(57) ABSTRACT

A system and method for generating a user interface for a speech recognition program module which provides user feedback by inserting a place mark or bar into the text of the document at the insertion point. The place mark indicates to the user that the speech recognition program module has recorded the dictated speech string and is in the process of translating the speech string. The place mark consists of a string of characters, such as a string of ellipses. The place mark has a length that is proportional in length to the expected length of the text that the user has dictated. The length of the place mark is based on the elapsed time of the speech string dictated by the user. When the speech recognition engine has completed the translation of the speech string into text, the final text replaces the place mark in the document. The place mark may be highlighted in different colors or the characters rendered in different colors to indicate to the user the volume level of the speech string being translated.

14 Claims, 7 Drawing Sheets

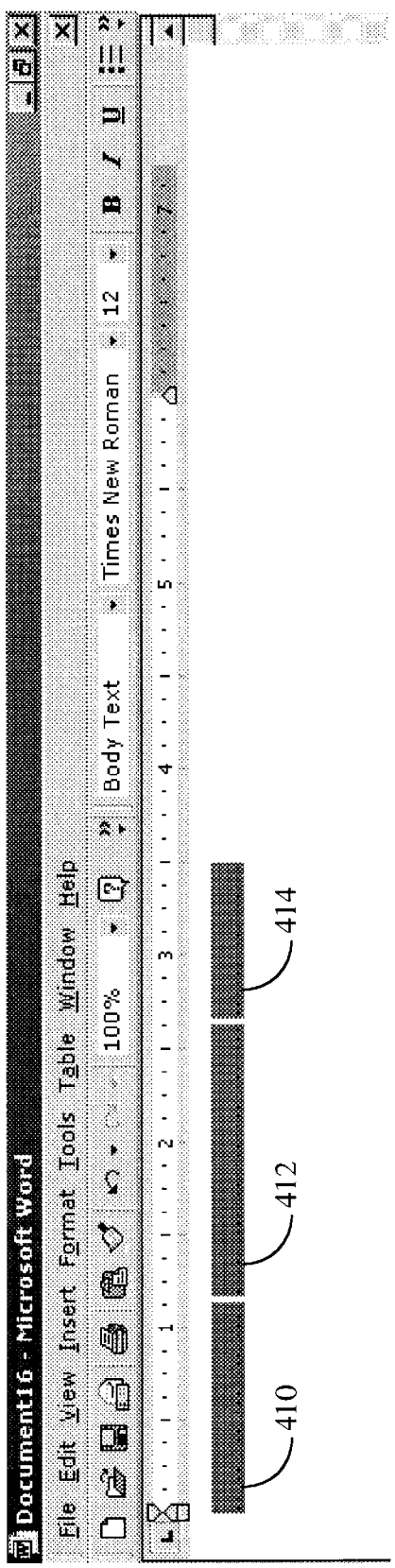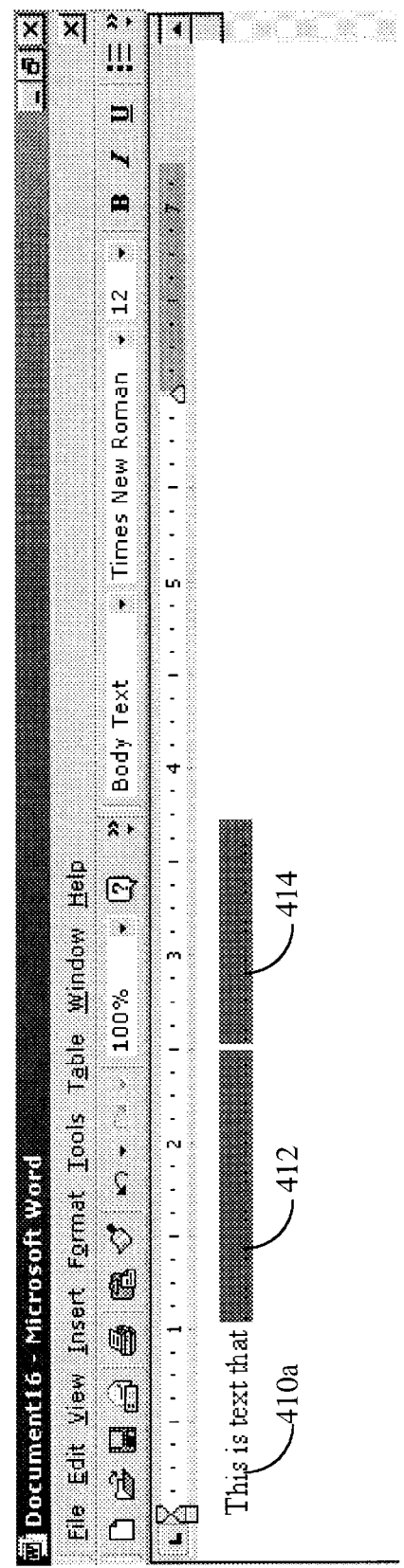
FIG. 4c
FIG. 4d

SPEECH RECOGNITION USER INTERFACE

TECHNICAL FIELD

The present invention relates to a system and method for generating a user interface for a speech recognition program module.

BACKGROUND OF THE INVENTION

A speech recognition program module offers a computer user substantial savings in time by allowing the user to dictate text directly into a document created using a word processor program module loaded on the computer. Even with increased processor speeds of modern personal computers, a speech recognition program module still requires processing time in order to recognize spoken words and to translate them into text for display in a word processor document. As a result of the time delay resulting from the recognition and translation process, the user should receive feedback confirmation that the speech was recorded by the speech recognition program module and is being translated.

Some existing speech recognition program modules fail to give the user any confirmation that the speech recognition program module has recorded the speech and is translating the speech. Such speech recognition program modules often do not display anything until translation of the speech into the final text is completed and displayed as the final text at the insertion point in the document. Such lack of feedback during the translation delay often causes users to dictate in short snippets in order to verify that the speech has been recorded and properly translated. Dictating in short snippets creates two additional problems. First, the time delay between the user's dictation and the user's verification increases the overall time required to dictate a document. Second, dictating in short snippets is not the best method of dictating using speech recognition program modules. A longer string of speech gives the speech recognition module the best chance of accurate translation because of the context offered by a longer string of speech as opposed to a short snippet.

Other speech recognition program modules provide feedback to the user during the translation delay by displaying the first approximation or first hypothesis of the translated text as soon as the hypothesis is available. The first hypothesis is displayed either directly in the document or in a floating window within the document. Displaying the hypothesis directly in the document or in a floating window adjacent the document can be distracting to the user. As translation continues and the hypothesis is replaced with updated translated text, the display must be updated to reflect those changes in the displayed text. This constant changing or flashing of text in the user interface can be distracting. The user is likely to be distracted by the hypothesis text which may be wrong and stop dictating to address the perceived error. The floating window further creates the additional problem of dividing the user's attention between the text of the document at the insertion point and the flashing floating window text.

In order to address the problem of speech level, some speech recognition program modules display a volume level meter similar to those found on some stereo receivers. The level meter allows the user to verify that the microphone is actually picking up his or her speech. Such a separate level meter requires the user to divide his or her attention between the text of the document and the separate level meter in the graphical user interface.

Consequently, prior art speech recognition program modules often provide either too little user feedback or overload the user with feedback that is distracting or requires the user to divide his or her attention during the course of dictating.

Consequently, there is a need in the art for a system and method for generating a user interface for a speech recognition program module which offers feedback to the user with respect to the progress of the speech translation into text.

SUMMARY OF THE INVENTION

The present invention addresses above identified problems by providing a system and method for generating a user interface that confirms to the user that the speech recognition program module has recorded the speech and that the speech is being translated. Particularly, the method of the present invention inserts a place mark or bar within the document text at the insertion point. The place mark or bar its proportional in length to the expected length of the text that the user has dictated. The expected length of the place mark is based on the elapsed time of the speech string dictated by the user. As the speech recognition program module completes its translation of the speech, the final version of the translated text replaces the place mark or bar, beginning at the insertion point. In one embodiment of the present invention, the place mark is a bar consisting of a string of predetermined characters.

In addition, the place mark (the character string) can be highlighted, and the color of the highlighting can be used to indicate to the user the volume level of the recorded speech. Instead of highlighting, the characters in the character string can be colored to indicate to the user the volume level of the recorded speech.

The various aspects of the present invention may be more clearly understood and appreciated from a review of the following detailed description of the disclosed embodiments and by reference to the drawings and claims.

BRIEF DESCRIPTION OF THE DRAWINGS

FIGS. 4a through 4h are screen shots depicting the user interface presented in connection with the present invention.

DETAILED DESCRIPTION

Figure 1:
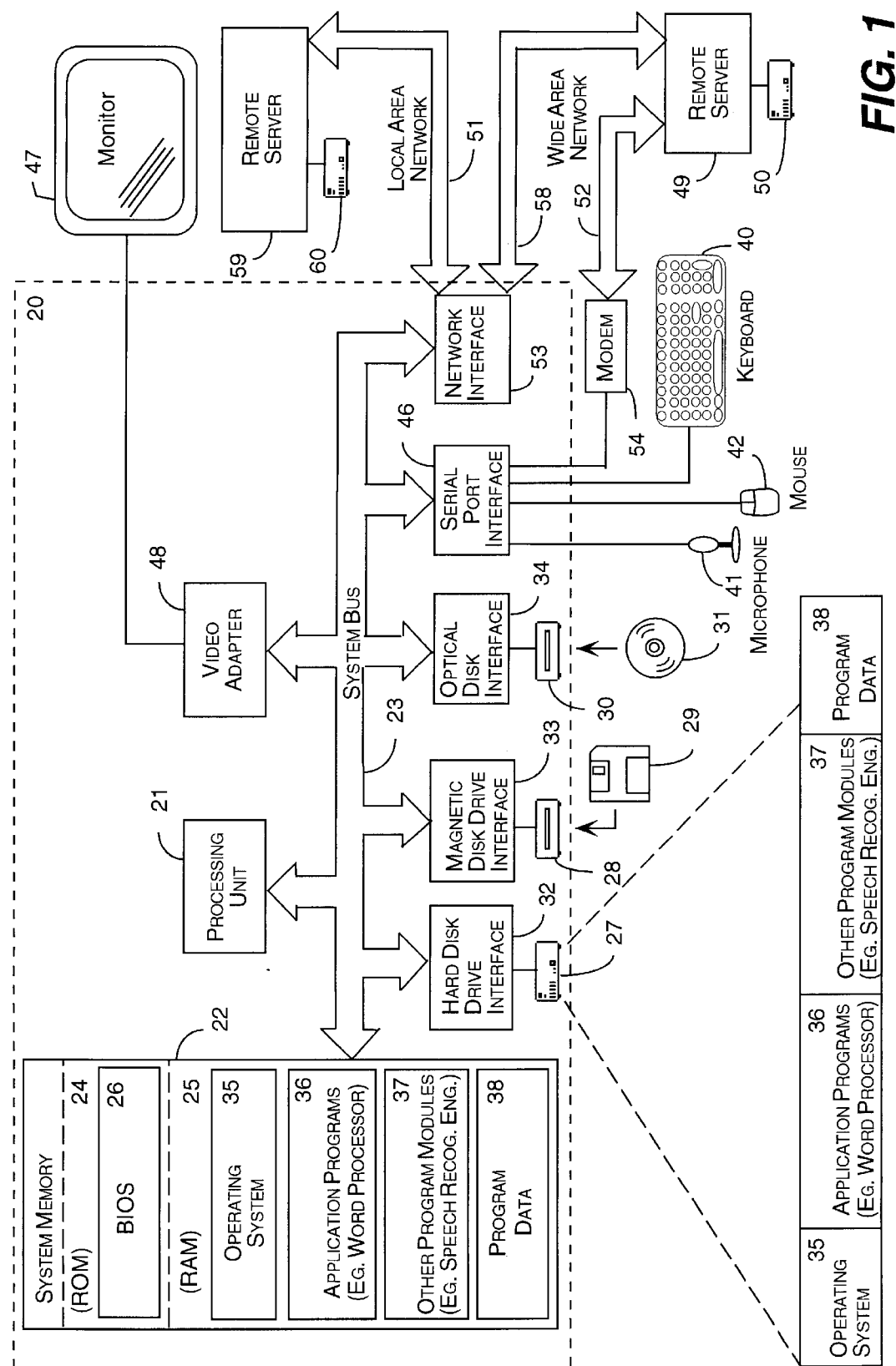
FIG. 1 is a block diagram of a computer system that provides the operating environment for an illustrative embodiment of the present invention.

The present invention is directed to a system and method for generating a user interface that confirms to the user that the speech recognition program module has recorded the user's dictated speech and that the speech is being translated so that the user will not interrupt his or her dictation to address perceived problems resulting from the translation delay inherent in speech recognition program modules. Referring now to the drawings, in which like numerals represent like elements throughout the several figures, aspects of the present invention and an illustrative operating environment will be described.

An Illustrative Operating Environment

FIG. 1 and the following discussion are intended to provide a brief, general description of a suitable computing environment in which the invention may be implemented.

While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an illustrative system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a local hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk, and a CD-ROM disk, those skilled in the art will appreciate that other types of media which are readable by a computer, such as magnetic cassettes, flash memory cards, digital video disks, Bernoulli cartridges, and the like may also be used in the illustrative operating environment of FIG. 1.

A number of program modules may be stored in the drives and RAM 25, including an operating system 35, one or more application programs 36 (for example word processor applications, spreadsheet applications, and presentation applications), other program modules 37 (for example a speech recognition engine), and program data 38. The data 38 on local hard disk drive 27 may constitute speech data used in connection with the speech recognition engine and the word processor program.

A user of computer 20 may enter commands and information into the personal computer 20 through a keyboard 40, a microphone 41, and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port, a microphone input, or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computers 49 and 59. The remote computers 49 and 59 may be servers, routers, peer devices, or other common network nodes, and the remote computers 49 and 59 typically include many or all of the elements described relative to the personal computer 20, although only memory storage devices 50 and 60 have been illustrated in FIG. 1. The logical connections to computers 49 and 59 depicted in FIG. 1 include a local area network (LAN) 51 and wide area networks (WAN) 52 and 58. Such networking environments are commonplace in offices, enterprise-wide computer networks, intranets, and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. A WAN connection may also be made through the network interface 53 to WAN 58. In a networked environment, program modules depicted relative to the personal computer 20, or portions thereof, may be stored in the remote memory storage device. Particularly, each remote computer 49 and 59 with respective storage devices 50 and 60 are can be searchable information repositories. Those of ordinary skill in the art will appreciate that the network connections shown are illustrative, and other means of establishing a communications link between the computers may be used.

Figure 2:
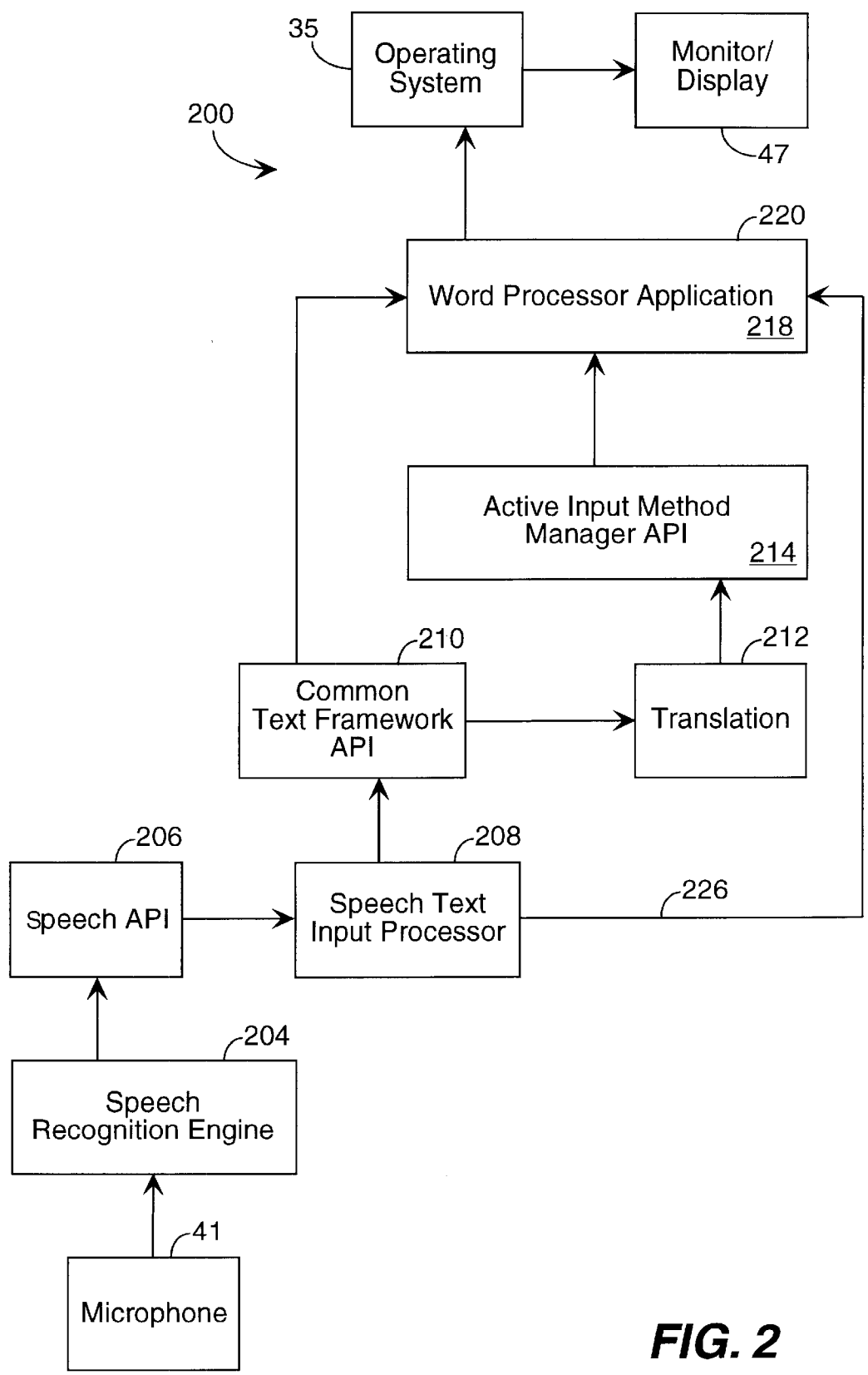
FIG. 2 is a block diagram depicting the major components of an illustrative embodiment of the present invention.

Turning to FIG. 2, the system 200 represents a high level block diagram of a speech recognition system in which the present invention is implemented. The speech recognition system 200 includes microphone 41, speech recognition engine 204, speech application program interface (API) 206, speech text input processor 208, common text framework API 210, translation module 212, active input method manager API 214, word processor application (or other text based application) 218, operating system 35, and monitor/display 47. The word processor application 218 may include Microsoft Word, manufactured by Microsoft Corporation of Redmond, Wash., the assignee of the present invention. Other applications such as Microsoft Excel and Power Point, both manufactured by Microsoft Corporation, may also be used in conjunction with the present invention.

The user dictates a string of speech into the microphone 41, and the speech string is recorded by the speech recognition engine 204. Once the speech recognition engine 204 has recorded the string of speech, the speech recognition engine begins translating the recorded speech into text. Once translated, the text will be passed from the speech recognition engine 204 to the word processor application 218, and the translated text ultimately will be displayed to the user on monitor/display 47. Because the translation takes time to complete, a delay results between the time the user dictates the speech string until the final translated text is available to be rendered on the monitor/display 47. That delay between the dictation by the user and the appearance of the final translated text on the monitor/display 47 compels the need for the user interface generated by the present invention.

Once the speech string has been recorded by the speech recognition engine 204, the speech recognition engine 204 passes information about the speech string to the speech text input processor 208 by means of speech API 206. The information passed to the speech text input processor 208 includes the length of the speech string dictated by the user, a digitized recording of the speech string, the first hypothesis for the text, the final translation of the speech string, and information correlating the digitized speech recording to the translated text.

A person of ordinary skill in the art will appreciate that the length of the speech string dictated by the user and the digitized recording of speech string will be promptly available to the speech text input processor 208, but that the first hypothesis for the text, the final translation of the speech string, and the information correlating the digitized speech recording to the translated text will be delayed until such time as the speech recognition engine 204 can complete its analysis and translation of the speech string.

The speech text input processor 208 processes information received from the speech recognition engine 204 which processing includes checking grammar and spelling and generating the user interface in accordance with the present invention. In addition, the speech text input processor 208 in combination with the common text framework API 210 records and correlates the digitized recorded speech with the final translated text generated by the speech recognition engine 204. The common text framework API 210 handles the communications between an input method editor (not shown) and the word processor application 218. In addition, the common text framework API 210 in combination with the translation module 212 provides a framework within which the final translated text can be edited and in which foreign languages having large character sets can be edited and rendered. Once the text has been processed by the common text framework API 210 or by the translation module 212, the resulting text is passed to the word processor application 218. For text processed by the common text framework API 210, the text is passed directly to the word processor application 218. For text processed by the translation module 212, the text is passed to the word processor application 218 from the translation module 212 by means of the active input method manager API 214. The word processor application 218 passes the text to the operating system 35 which in turn renders and displays the text on the monitor/display 47 in conventional fashion.

The present invention relates to the method by which the speech text input processor 208 generates a user interface for display to the user during the time that the speech recognition engine 204 is translating the recorded speech strings into text. The speech text input processor 208 generates the user interface and passes the interface information to the word processor application 218 via common text framework API 210. The word processor application 218 then passes the user interface to the operating system 35 for display on the monitor/display 47.

The generation of the user interface by the speech text input processor 208 is described in connection with method 300 shown in an FIG. 3. The method 300 for generate the user interface begins at step 302 and proceeds to step 304. At step 304, the first speech string of a series of speech strings dictated by the user is recorded and separated from subsequent speech strings. The digitized speech string is then translated into text at step 312 by the speech recognition engine 204. During the time that the first speech string is being translated at step 312, the method proceeds from step 304 to step 310. At step 310, the speech string being translated at step 312 is correlated with the place mark and ultimately with the translated text that will replace the place mark on the monitor/display 47. From step 310, the method proceeds to step 311 where the method determines whether the place mark has already been inserted. If the place mark has not already been inserted, the method follows the "No" branch to step 306. If on the other hand the place mark has already been inserted, the method follows the "Yes" branch to step 316.

At step 306, the speech text input processor 208 calculates the length of the place mark based on the time length of the speech string. Once the length of the place mark has been calculated at to step 306, the method proceeds to step 308 where the speech text input processor 208 determines the color of the highlighting (or character string) based on the volume level of the speech string. From step 308, the method of proceeds to step 314 where the place mark is inserted by the word processor 218 into the document at the insertion point. Once displayed in the word processor document on the monitor 47, the place mark serves as an indication to the user that the speech recognition engine 204 has recorded the speech and that the speech recognition engine 204 is translating the speech into text.

From step 314, the method proceeds to step 316. At step 316, the method determines if the translation of the string at step 312 is complete. If the translation at step 312 is complete, the method proceeds along the "Yes" branch to step 320 where the translated text is inserted into the document and replaces the place mark that correlates with that translated text. If on the other hand, the translation at step 312 is not complete, the method proceeds from step 316 along the "No" branch and loops at step 316 until the "Yes" condition is satisfied, and the method for the particular speech string can proceed to step 320.

At step 320, the method replaces the place mark with the final translated text that correlates with the place mark. Once the place mark has been replaced by the final translated text at step 320, the method proceeds to step 322. At step 322, the method determines whether the recording of speech strings has ended. If recording of speech strings has ended, the method follows the "Yes" branch to step 324 where the method 300 ends. If, however, the speech recording has not ended, the method follows the "No" branch from step 322 to step 310 where the next string of speech is processed for a place mark as previously described.

Figure 3:
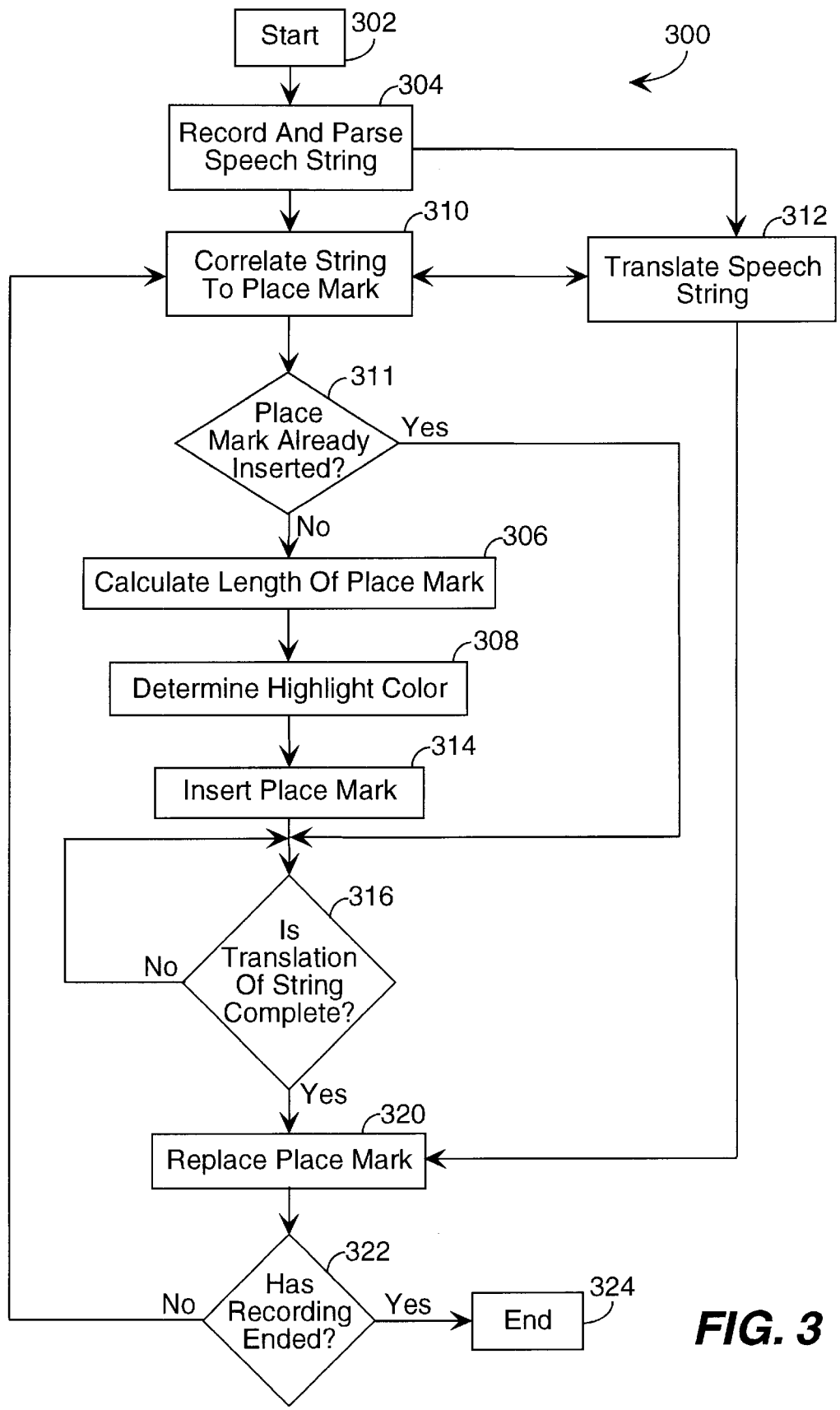
FIG. 3 is a flowchart depicting a method of the present invention.

Turning to FIGS. 4a through 4h, there is shown the user interface generated in accordance with the method 300 shown in FIG. 3. Each of FIGS. 4a through 4h depicts a screen shot of a window 400 of a document produced by the word processor application 218. Particularly, the word processor application interface shown in FIGS. 4a through 4h is for Microsoft Word manufactured and sold by Microsoft Corporation of Redmond, Was., assignee of the present invention. The window 400 includes a menu bar 402, a tool bar 404, a ruler 406, and an editing region or text space 408. FIGS. 4a through 4h show the progression of the interface presented to the user while the speech recognition engine 204 is translating a sequence of speech strings.

When the first speech string is dictated, the method 300 of the present invention determines the length of the first speech string and the volume level of the speech. The method 300 then constructs a place mark, such as place mark 410 shown in FIG. 4a. The place mark 410 has a length proportional to the time length of the speech string and a highlight color indicating the volume level of the speech string. The place mark 410 consists of a string of characters, in this case a series of ellipses, that are highlighted with a color to indicate the volume level of the speech string recorded. The number of characters comprising the place mark is determined by the time length of the speech string being translated by the speech recognition engine 204 into text. Any string of characters could be used for the place mark. In accordance with the present invention, the highlighting of the place mark may be green for proper speech level, red for speech that is too loud, and yellow for speech that is too soft. Other colors may be used to communicate to the user the volume level of the speech recorded. In place of colored highlighting, the place mark characters themselves may be colored to indicate volume level.

Figure 4A:
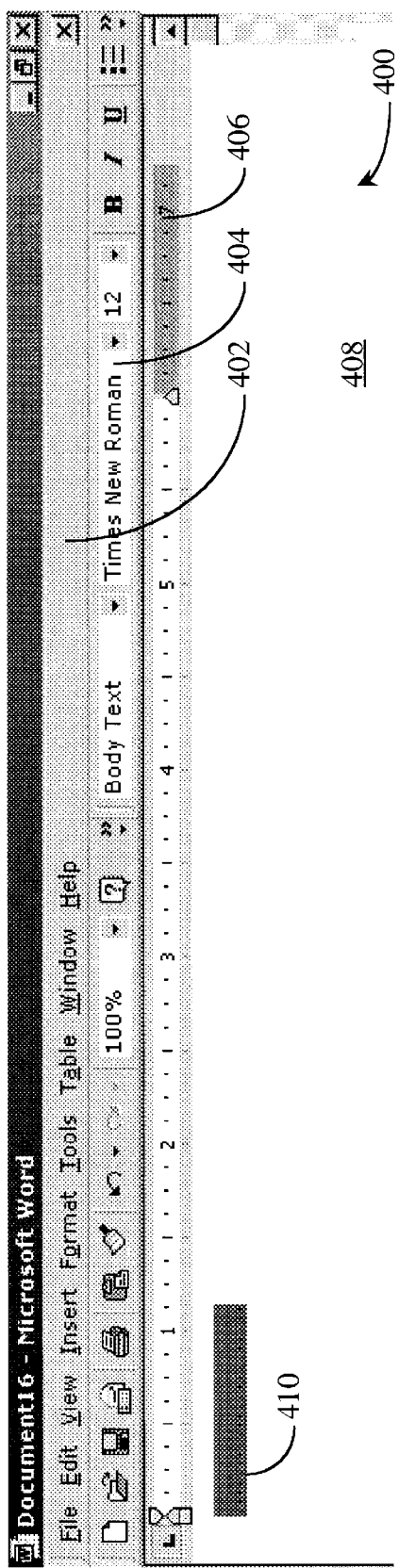
Figure 4B:
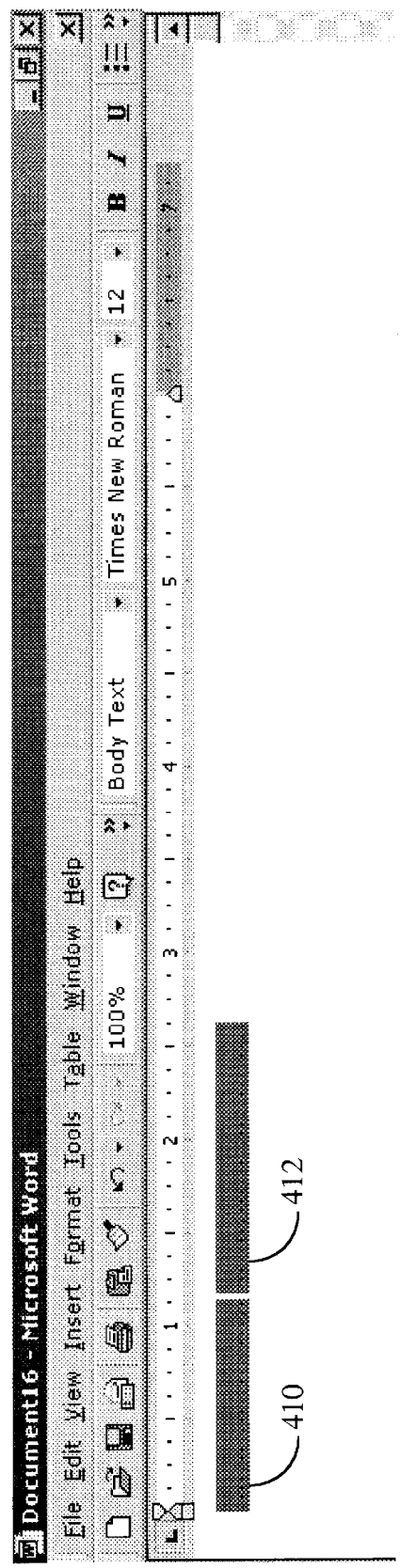

FIG. 4*b* shows a second place mark 412 which has been inserted into the text space 408 to indicate that a second string of speech has been recorded and is being translated by the speech recognition engine 204 . Again, the number of characters in the place mark 412 is based on the time length of the second speech string being translated. Likewise, the highlighting of the place mark 412 is based on the volume level of the speech string that is being translated. In FIG. 4*c* a third place mark 414 has been inserted to indicate that a third speech string has been recorded and is being translated by the speech recognition engine 204.

FIG. 4*d* shows that the loop at step 316 in FIG. 3 has been completed, and the place mark 410 has been replaced by the related final text 410*a*. The other place marks 412 and 414 remained in the text space 408 while the speech recognition engine 204 continues to translate the speech strings relating to those two place marks.

Figure 4E:
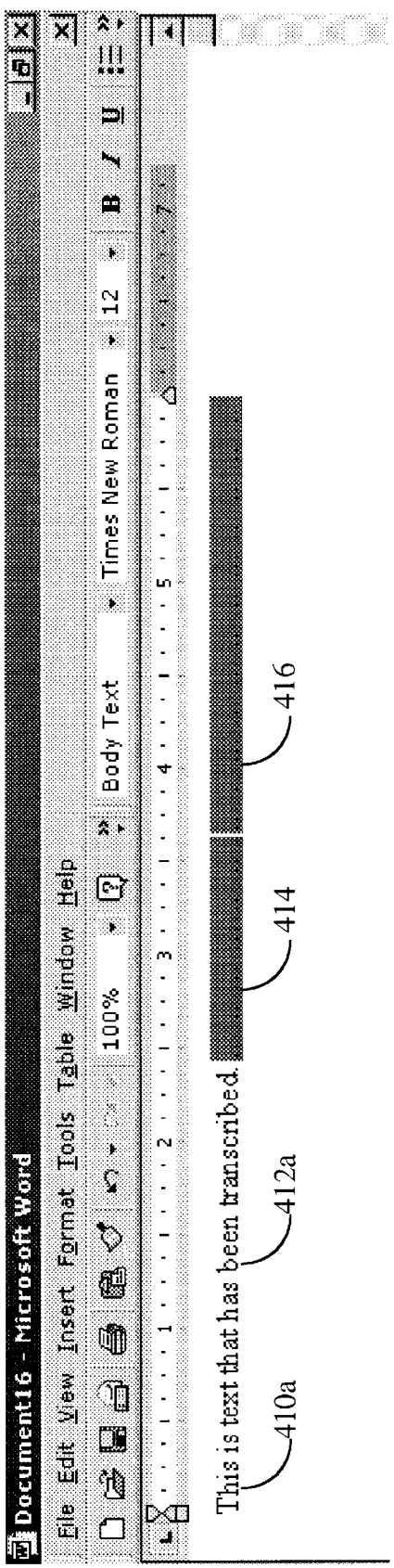
Figure 4F:
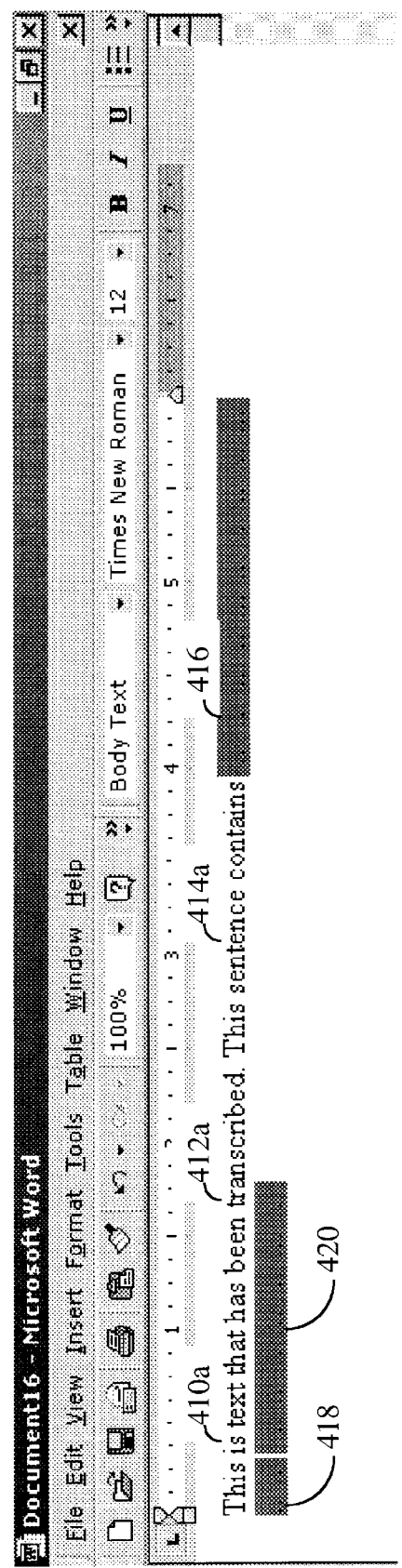
Figure 4G:
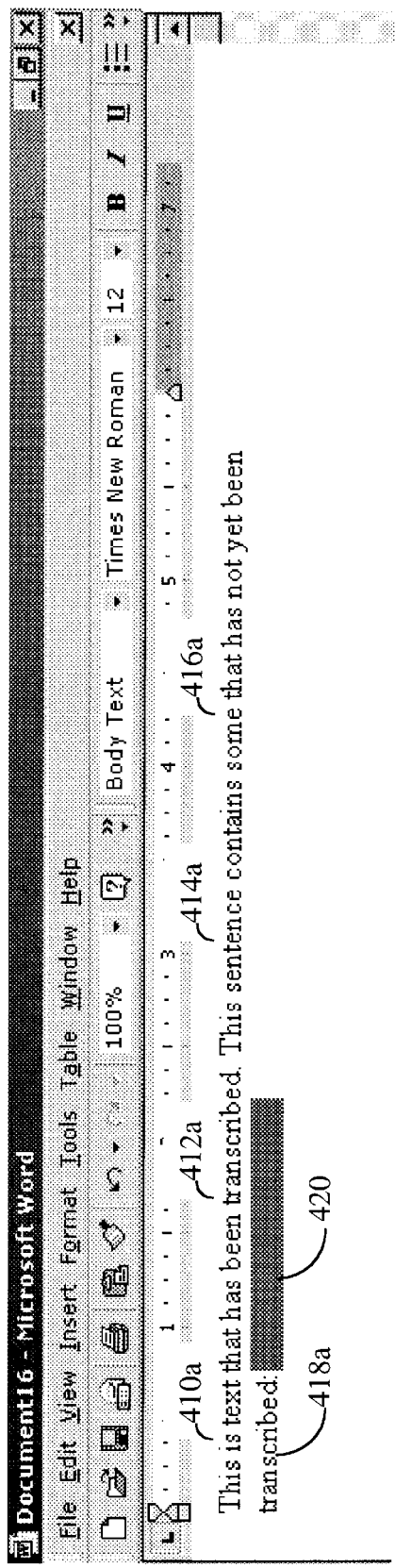
Figure 4H:
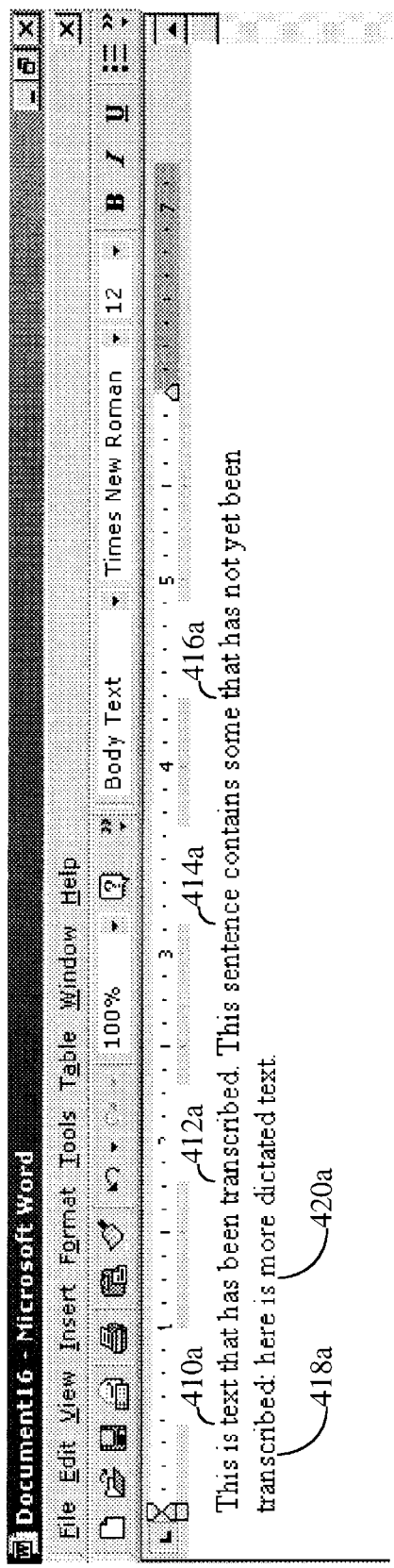

FIG. 4*e* shows further progress of the method 300 where the place mark 412 has been replaced by the text 412*a,* and an additional place mark 416 has been inserted indicating another speech string has been dictated but not yet translated. FIGS. 4*f* through 4*h* show the progress of the method 300. Each place mark is sequentially replaced by the final translated text until all of the place marks have been replaced as shown in FIG. 4*h*.

The present invention provides a system and method that confirms to the user that the speech recognition program module has recorded the speech and that the speech is being translated.

We claim:

1. A method for providing visual feedback to a user of a speech recognition program module wherein the speech recognition program module, in response to speech from the user for a length of time, translates the speech into text and inserts the translated text at an insertion point in a document displayed to the user, the method comprising:
    a) prior to the speech recognition program module completing translation of speech to text, placing a place mark within the document at the insertion point; and
    b) after the speech recognition program module has completed translation of the speech to text, replacing the place mark with final text resulting from completion of the translation of the speech to text by the speech recognition program module.

2. The method of claim 1, wherein place mark:
    a) has a length and occupies a space extending from the insertion point, and
    b) the length of the place mark is proportional to the length of time of the user's speech, and
   wherein the text generated by the speech recognition program module replaces the place mark beginning at the insertion point.

3. The method of claim 2, wherein place mark comprises a string of characters.

4. The method of claim 1, wherein the user's speech is delivered to the speech recognition program module at a volume that varies over time and wherein the place mark is highlighted, and the highlighting is colored in accordance with volume of the speech.

5. The method of claim 4, wherein place mark comprises a string of characters.

6. The method of claim 1, wherein the user's speech is delivered to the speech recognition program module at a volume that varies over time and wherein the place mark is colored in accordance with volume of the speech.

7. The method of claim 6, wherein place mark comprises a string of characters.

8. A display device having a user interface for providing visual feedback to a user of a speech recognition program module wherein the speech recognition program module, in response to speech from the user for a length of time, translates the speech into translated text and inserts the translated text at an insertion point in a document displayed to the user, the user interface comprises:
    a) a place mark inserted into the document at the insertion point while the speech recognition program module is translating the speech to text; and
    b) translated text replacing the place mark after completion of the translation of the speech to text by the speech recognition program module.

9. The display device of claim 8, wherein place mark:
    a) has a length and occupies a space extending from the insertion point, and
    b) the length of the place mark is proportional to the length of time of the user's speech.

10. The display device of claim 9, wherein place mark comprises a string of characters.

11. The display device of claim 8, wherein the user's speech is delivered to the speech recognition program module at a volume that varies over time and wherein the place mark is highlighted, and the highlighting is colored in accordance with volume of the speech.

12. The display device of claim 11, wherein place mark comprises a string of characters.

13. The display device of claim 8, wherein the user's speech is delivered to the speech recognition program module at a volume that varies over time and wherein the place mark is colored in accordance with volume of the speech.

14. The display of claim 13, wherein place mark comprises a string of characters.

* * * * *

UNITED STATES PATENT AND TRADEMARK OFFICE
CERTIFICATE OF CORRECTION

PATENT NO. : 6,697,777 B1
DATED : February 24, 2004
INVENTOR(S) : Ho et al.

It is certified that error appears in the above-identified patent and that said Letters Patent is hereby corrected as shown below:

Column 2,
Line 19, delete "its" and insert -- is -- in place thereof.

Signed and Sealed this

Twenty-second Day of June, 2004

JON W. DUDAS
*Acting Director of the United States Patent and Trademark Office*